United States Patent [19]

Hellemans et al.

[11] 4,008,048
[45] Feb. 15, 1977

[54] INSTALLATION FOR THE DISCONTINUOUS PRODUCTION OF POLYETHYLENE TEREPHTHALATE

[75] Inventors: Ludovicus Maria Hellemans, Boechout; Roger Isidoor De Saedeleer, Edegem; Johannes Maria Verheyen, Borsbeek, all of Belgium

[73] Assignee: AGFA-GEVAERT N.V., Mortsel, Belgium

[22] Filed: July 3, 1974

[21] Appl. No.: 485,620

[30] Foreign Application Priority Data

July 6, 1973 United Kingdom ............ 32237/73

[52] U.S. Cl. .............................. 23/260; 23/253 A; 137/209; 137/577; 260/75 M
[51] Int. Cl.² ...................... B01J 1/00; C08G 63/00
[58] Field of Search ........................ 23/260, 253 A; 260/75 M; 137/209, 577

[56] References Cited

UNITED STATES PATENTS

| | | | |
|---|---|---|---|
| 1,989,760 | 2/1935 | Masury ........................ | 137/209 X |
| 3,003,515 | 10/1961 | Moberly ........................ | 137/577 X |
| 3,054,776 | 9/1962 | Higgins ........................ | 260/75 M |
| 3,255,161 | 6/1966 | Cobb, Jr. ........................ | 23/260 X |
| 3,427,287 | 2/1969 | Pengilly ........................ | 260/75 M |
| 3,596,673 | 8/1971 | Laucournet ........................ | 137/209 |
| 3,600,137 | 8/1971 | Girantet et al. ................ | 23/260 X |
| 3,644,294 | 2/1972 | Siclari et al. ................... | 260/75 M |
| 3,689,461 | 9/1972 | Balint et al. .................... | 23/260 X |
| 3,718,544 | 2/1973 | Sims ............................. | 137/577 X |
| 3,849,379 | 11/1974 | Jeurissen et al. ............... | 260/75 M |

*Primary Examiner*—Morris O. Wolk
*Assistant Examiner*—Arnold Turk
*Attorney, Agent, or Firm*—William J. Daniel

[57] ABSTRACT

An installation for use in the discontinuous production of high molecular weight polyethylene terephthalate according to either a first process wherein the production starts by producing bis(2-hydroxyethyl)-terephthalate by transesterification from dimethylterephthalate and ethylene glycol, or according to a second process starting with the production of a precondensate by reacting terephthalic acid with ethylene glycol. The installation comprises substantially a first and a second reaction vessel and a connection between said vessels, and means whereby the flow of reaction product through said connection can be accurately controlled to permit all or only part of the contents of the first vessel to pass to the second vessel.

5 Claims, 1 Drawing Figure

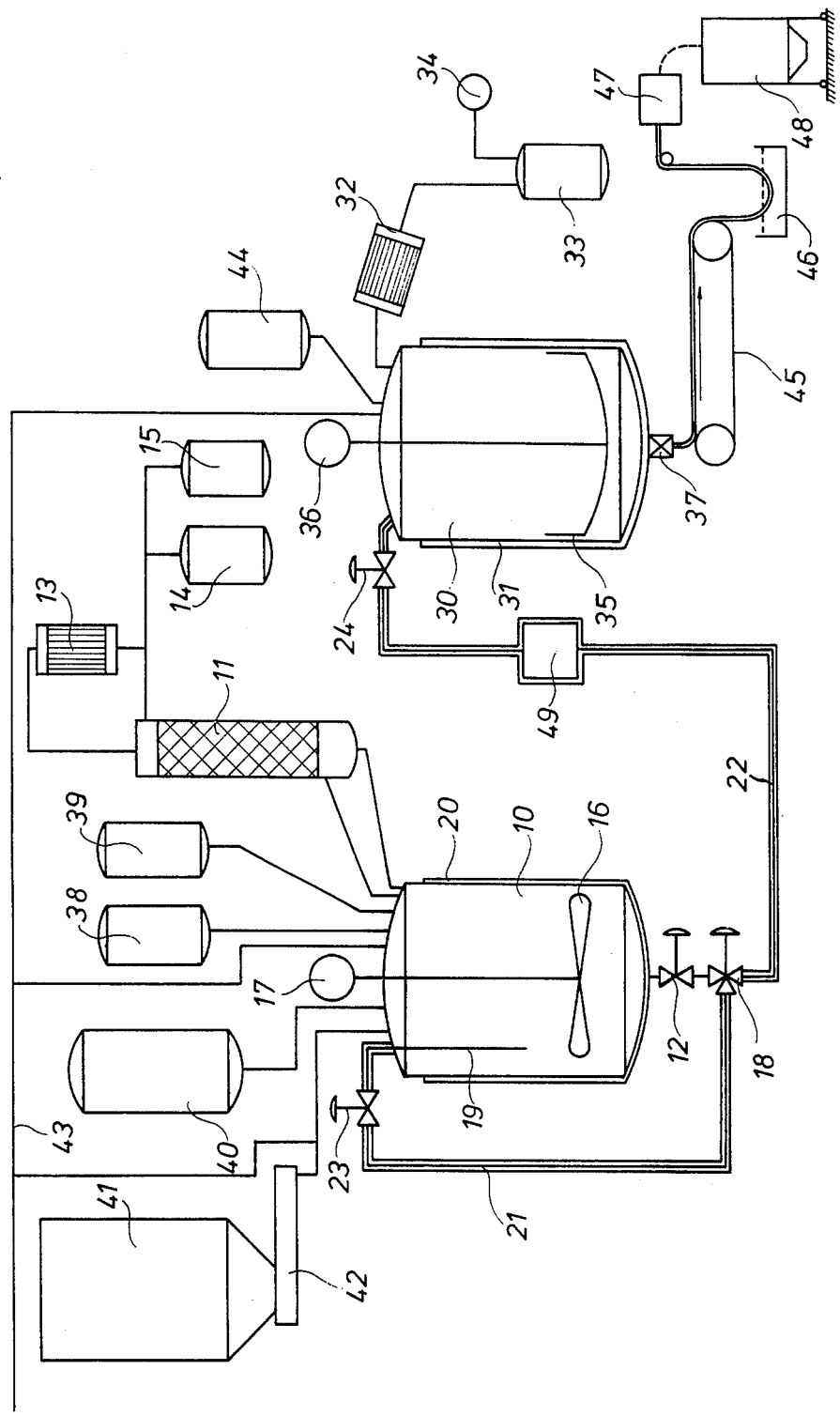

INSTALLATION FOR THE DISCONTINUOUS PRODUCTION OF POLYETHYLENE TEREPHTHALATE

This invention relates to installations for use in the discontinuous production of high molecular weight polyethylene terephthalate and to processes of producing such polymer using such installations.

For the purposes of this specification it is necessary to define two types of process for producing high molecular weight polyethylene terephthalate. In one type of process (hereafter called "Type I Process") bis(2-hydroxyethyl)-terephthalate is produced by transesterification from dimethylterephthalate and ethylene glycol at elevated temperature and atmospheric pressure and the bis(2-hydroxyethyl)-terephthalate is subsequently polycondensed at elevated temperature and sub-atmospheric pressure to obtain polyethylene terephthalate. The other type of process (hereafter called "Type II Process") starts with the production of a precondensate consisting of a low molecular weight esterification product, e.g., a product having an average degree of polycondensation of 2 to 20, by reacting terephthalic acid with ethylene glycol in the presence of previously formed bis(2-hydroxyethyl)terephthalate or precondensate; in a subsequent stage about half or more (but not all) of the amount of the precondensate produced in the first stage is further polycondensed to form the required high molecular weight linear polyester; the remaining part of the precondensate produced in the first stage is used as such or after reaction with ethylene glycol, in the first stage of a subsequent performance of the process, and so on batchwise.

At the very start of the production of the first batch in the performance of a Type II process, a certain amount of bis(2-hydroxyethyl)-terephthalate is needed. This bis(2-hydroxyethyl)-terephthalate can be obtained by known processes, e.g., by a transesterification reaction between dimethyl terephthalate and ethylene glycol. This reaction is accelerated catalytically by the addition of a known transesterification catalyst.

The synthesis of polyethylene terephthalate starting from terephthalic acid according to a Type II process is more efficient than synthesis starting from dimethyl terephthalate. The proportion of terephthalic acid built into the polyester molecule is much higher than the proportion of dimethyl terephthalate effectively used in a Type I process. However, notwithstanding the greater efficiency of the Type II process there is more resistance in industry to the installation of manufacturing plant for operating such process. This reluctance is mainly due to possible difficulties which may arise in obtaining supplies of terephthalic acid having a sufficient degree of purity.

The present invention provides an installation which can be used for the performance of either a Type I or a Type II process or vice versa if that should at any time be required.

According to the present invention there is provided an installation suitable for use in the discontinuous production of high molecular weight polyethylene terephthalate by each of the Type I and the Type II processes as herein defined, such installation comprising a first reaction vessel, means for maintaining the interior of such vessel at elevated temperature appropriate for the reaction to be performed in the first stage of a said process, means for delivering an inert gas into said first vessel for maintaining an inert atmosphere over a reaction mixture therein; a second reaction vessel, means for establishing and maintaining the interior of such vessel at elevated temperature and sub-atmospheric pressure appropriate for the polycondensation reaction of a said process; means connecting said first and second vessels so as to permit reaction product to flow from said first vessel to said second vessel, and metering means whereby such flow of reaction product can be controlled to permit all or only part of the contents of such first vessel to pass to said second vessel.

Preferably the said metering means is movable from one to another of two predetermined settings one of which allows the entire contents of said first vessel to discharge to said second vessel and the other of which allows 50 to 75% of the contents of said first vessel, when full, to discharge to said second vessel.

The vessel connecting means and the metering means may comprise a first discharge conduit leading from the bottom of the first vessel to the second vessel, valve means whereby such conduit can be opened or closed, a second discharge conduit leading to said second vessel from a position within said first vessel at a level intermediate the top and bottom thereof so that some of the contents of such vessel can be discharged through such second discharge conduit by forcing inert gas under pressure into said vessel and valve means whereby such second conduit can be opened or closed.

The installation preferably comprises means whereby the level in the first vessel at which the inlet of said second discharge conduit is situated can be varied to suit different circumstances and in particular in dependence on the level to which the first vessel is filled with reaction mixture in the first stage of the process and on the proportion of the reaction product formed in such first stage which is to be discharged to the second vessel. Usually such proportion is from 50 to 75%.

The installation preferably includes means for maintaining said discharge conduits at elevated temperature between the first and second vessels.

The invention includes a process whereby high molecular weight polyethylene terephthalate is produced according to a Type I process as herein defined, in an installation according to the invention as above defined, the metering means of such installation being controlled to allow complete discharge of the precondensate from the first to the second vessel.

The invention also includes a process wherein high molecular weight polyethylene terephthalate is produced according to a Type II process as herein defined, in an installation according to the invention as above defined, the metering means of such installation being controlled to cause at least half of the precondensate formed in the first vessel in the first stage of the process to discharge into the second vessel.

In case the installation according to the invention is used for the production of polymer in accordance with the Type II process as herein defined, said process preferably has the following features: in a first reaction stage terephthalic acid and ethylene glycol are reacted in the presence of bis(2-hydroxyethyl)terephthalate, there being used from 1 to 1.1 mole of terephthalic acid per mole of bis(2-hydroxyethyl)terephthalate (preferably 1 mole of terephthalic acid per mole of bis(2-hydroxyethyl)terephthalate) and 0.3 to 0.9 moles of ethylene glycol per mole of free terephthalic acid, the mixture being heated at a temperature between 240° and 310° C in an inert atmosphere and at atmospheric pressure until a precondensate consisting of a low molecular weight esterification product is obtained. In a second stage, half the amount of such precondensate is separated out and polycondensed further at a temperature of 260° to 300° C and at sub-atmospheric pressure until a high molecular weight linear polyester is obtained. The remaining half of the precondensate formed in the first stage is reacted at a temperature above 200° C with ethylene glycol added in such amount that the sum of that amount and half the amount of ethylene glycol used in the first stage is molecularly equivalent to the amount of free terephthalic acid used in such first stage, thereby glycolising the precondensate formed in the first stage to bis(2-hydroxyethyl)terephthalate for use as starting product in the production of a further batch of polyethylene terephthalate.

The invention will be described hereinafter by way of example with reference to the accompanying FIGURE which represents a flow scheme of an installation for carrying out the present invention.

Referring to the figure, the esterification part of the installation comprises an esterification vessel 10, a distillation column 11 with a reflux portion, a condenser 13, and tanks 14 and 15 for collecting water or methanol, and ethylene glycol. The vessel 10 is provided with a jacket 20 through which a liquid is circulated for controlling the temperature of the interior of the vessel, and with a vertical stirrer 16 driven by an electric motor 17. At the bottom of the vessel there are provided a one-way valve 12 and a three-way valve 18. A rigid tube 19 extends vertically in the upper part of the vessel and passes airtightly through the cover of the vessel. A conduit 21 forms via a valve 23 a connection between the tube 19 and the three-way valve 18, whereas a conduit 22 wherein a filter 49 is provided forms via a valve 24 the connection between the valve 18 and the polycondensation vessel 30 of the installation. The mentioned conduits and the filter are provided with jackets through which a heat-controlling liquid is circulated.

The polycondensation part of the installation comprises the polycondensation vessel 30 with a jacket 31, a condensor 32, a tank 33 for receiving condensed glycol, and a vacuum aggregate 34. The vessel 30 is provided with an anchor mixer 35 which is rotated by a D.C. motor 36. The bottom of the vessel 30 may be put in communication with an extrusion die 37 having an elongate rectangular opening through which the reaction product of the vessel may be discharged in the form of a polymer band.

The esterification part of the installation comprises the following additional elements. A supply tank 38 for the catalyst solution and a supply tank 39 for the stabilization solution, a supply tank 40 for ethylene glycol and a metering system, not shown, in the connection between the tank 40 and the vessel 10, a measuring bunker 41 for terephthalic acid or for dimethylterephthalate and a mechanism 42, for instance in the form of an archimedean screw, for the transport of the powder-like product of the bunker 41 to the reaction vessel 10, and supply conduit 43 for nitrogen gas with branches to the conduit between the mechanism 42 and the reaction vessel 10, to the reaction vessel 10 and to the polycondensation vessel 30.

The polycondensation part of the installation comprises the following additional elements. A supply tank 44 for the catalyst for the polycondensation, an endless stainless steel belt 45 for receiving the extruded polymer band and spray nozzles (not shown) fo spraying demineralized water so as to cool the polymer band while on the transport belt, a tray 46 for collecting the water flowing from the band, a dicer 47 for cutting the polymer band into chips, and a container 48 for receiving the polymer chips.

It will be understood that an installation of the type described comprises in practice many other elmtents such as valves and metering means for the different supply tanks, temperature controls for different supply tanks and for the reaction vessels, a pressure control for the polycondensation vessel, supply means for a cooling liquid for the cooling of the condensers 13 and 32, a controller and a programmation device for the motor 36, a programmation device for the programmation of different control circuits of the installation, etc. The operation of all these elements is familiar to the skilled worker, and since these elements are unessential for the understanding of the operation of the present installation for carrying out either one of the two described processes, no furher details will be given on these elements in the following description.

The operation of the installation will be described hereinafter, while mentioning approximate quantities of products for the production of a batch of about 4000 kg of polyethylene terephthalate.

In the production of polyethylene terephthalate in accordance with the Type II process comprising first reacting terephthalic acid and ethylene glycol with bis(2-hydroxyethyl)terephthalate, the reaction vessel 10 is filled with 5400 kg of bis(2-hydroxyethyl)terephthalate resulting from a previous transesterification reaction between dimethyl terephthalate and ethylene glycol as described in the first paragraph of Example 1 of Belgian Patent Specification No. 783,149 of Agfa-Gevaert N. V. issued Nov. 8, 1972. Thereafter are added 3500 kg of terephthalic acid from the bunker 41 while a nitrogen atmosphere is established in the conduit between the mechanism 42 and the reaction vessel 10, 0.45 kg of germanium dioxide catalyst from the tank 38, and 2.0 kg of triphenyl phosphite stabilizer from the tank 39. The reactants were heated while stirring for 2 hours up to about 250° C whereafter 800 kg of ethylene glycol from tank 40 were added in 40 minutes by means of an appropriate metering device (not shown). During the addition the temperature was kept constant at a value situated between 250° and 265° C. After further heating, the temperature had risen to a value between 270° and 280° C. During the process water was distilled off through distillation column 11 and collected in tank 14. The esterification was finished when 800 kg of water was distilled off.

Valve 12 remaining closed, valve 18 was set so that conduits 21 and 22 communicated with each other, valves 23 and 24 were opened, and nitrogen overpressure was applied to the vessel 10 whereby about half the amount of precondensate formed was forced through connection conduits 21 and 22 and through filter 49 into the polycondensation vessel 30. The conduits 21 and 22, and the filter 49 were heated to a temperature of about 260° C. Polycondensation occurred for 3 hours at a pressure below 1 mm of mercury provided by the vacuum aggregate 34 and at a temperature of 282° C. No further catalyst was added, the germanium dioxide of the first reaction step still being present.

The glycol which was formed during the polycondensation reaction was cooled in condensor 32 and collected in tank 33.

After about 3 hours of polycondensation 4000 kg of polyester was forced out of the polycondensation vessel by applying nitrogen pressure from pipe 43, and collected upon the transport belt 45. Here it was sprayed with demineralized water to cool the polymer band and in dicer 47 the polymer band was cut into chips which were received in the container 48.

Meanwhile the remaining amount of precondensate in vessel 10 was glycolized by the addition of 910 kg of ethylene glycol from tank 40 and heating the reactants at a temperature between 200° and 250° C at atmospheric pressure in an atmosphere of nitrogen to reform bis(2-hydroxyethyl)terephthalate. The latter is used as starting material together with fresh terephthalic acid, catalyst, stabilizer and glycol in a following reaction batch.

In the production in accordance with the Type I process, comprising the reaction of dimethyl terephthalate with ethylene glycol, the reaction vessel 10 was filled with 4120 kg of dimethyl terephthalate from bunker 41, 2633 kg of ethylene glycol from tank 40, and 2.0 kg of manganese(II) phenylacetate catalyst from tank 38. This specific catalyst is disclosed in Belgian Patent Specification No. 773,589 of Agfa-Gevaert N. V. issued Apr. 7, 1972. The reactants were heated for 2 hours to a temperature between 200° and 225° C under atmospheric pressure while maintaining an atmosphere of dry nitrogen gas over the reaction mixture. 1240 kg of methanol produced was evacuated through the rectifying column 11 and collected in tank 15, and 700 kg of ethylene glycol which was collected in tank 14.

Once the ester interchange reaction had finished, the reaction mass consisting of bis(2-hydroxyethyl)terephthalate and lower condensation products were evacuated by nitrogen gas pressure from vessel 10 to the polycondensation vessel 30, through the now opened valve 12 and through the three-way valve 18 which was set so that the conduit from valve 12 communicated with the conduit 22. In vessel 30, 0.450 kg of germanium dioxide catalyst were added together with 2.00 kg of triphenyl phosphite stabilizer dissolved in ethylene glycol from tank 44.

The pressure in the polycondensation vessel was reduced by means of vacuum aggregate 34 to below 1 mm of mercury, while the reaction mass was stirred under dry nitrogen gas. 660 kg of glycol formed during the reaction was condensed in the horizontal condensor 32 and collected in tank 33.

After the reaction had continued for 3 hours at 282° C and at a pressure below 1 mm of mercury, the vacuum was released in the vessel 30 and just as in the Type II process a band of the polyester was forced out of the polycondensation vessel by means of an overpressure of nitrogen, collected upon transport belt 45, cooled with demineralized water, cut into chips in dicer 47 and 4000 kg of polyester chips were received in container 48.

It will be understood that many modifications can be made within the scope of the invention to the details of the two specific processes just described.

For instance, as mentioned in the introduction of the description, the production of polyethylene terephthalate which is based on the direct esterification of terephthalic acid may also occur with a derivative of ethylene glycol, e.g. ethylene oxide.

Furthermore, one or more of the following tanks may be added to the installation:

a. a supply tank in the polycondensation and/or the (trans)esterification part of the installation, containing a dispersion of a pigment such as $SiO_2$, $TiO_2$ or $CaCO_3$ in glycol for the production of pigmented chips.

b. a supply tank in the esterification and/or the transesterification or the polycondensation part of the installation for containing a dyed composition which may be added to the esterification, the transesterification or the polycondensation reaction in the production of colored polyethylene terephthalate. An example of such colored polymer is the blue-colored polyethylene terephthalate chips which are used in the photographic film industry in the manufacture of extruded film base for X-ray film.

c. a tank for containing polymer material which, for instance, has been cut from the edges of a polymer film in the course of its production process, or from film base which has been coated with light-sensitive layers showing an unsatisfactory quality, etc.

The discharging of the reaction product from the polycondensation vessel 30 may occur in another way than by means of an overpressure of nitrogen as described hereinbefore. For instance a pump may be provided between the bottom outlet of the vessel 30 and the extrusion die for forcing the reaction product through the die. Such pump may in addition be used for pumping the reaction product during the reaction cycle continuously from the outlet of the vessel to an inlet at the top of the vessel. By the provision of appropriate means for distributing the reaction product as it re-enters the vessel, the polycondensation time may be considerably reduced.

When using an apparatus with a discharge tube 19, the level of the tube entry opening and hence the proportion of the batch which is discharged to the second vessel may be adjustable by adjusting the height of the tube or by providing the lower end of the tube with a collar or sleeve which telescopes with respect to the tube and makes a sliding friction fit therewith or is otherwise securable in any adjusted position. Thus, the position of the effective take-in opening of the tube entry end can be adjusted with respect to the bottom of the vessel.

The transport of at least half a batch from the esterification vessel 10 to the polycondensation vessel 30 in accordance with the Type II process may also occur by other means that the vertical tube 19 illustrated in the figure. Thus, the metering means may comprise a positive displacement-type pump for pumping a pre-determined amount of the reaction product from the first to the second reaction vessel. In case successive batches in the first vessel differ in volume, the proportion of a given batch which is fed to the second vessel can be controlled to accord with a predetermined value by appropriate adjustment of the pumping time and/or the pumping volume of such displacement type pump.

The determination of the actual amount of the batch which is being discharged from the vessel may occur by means of a sensor extending vertically in the vessel 10, and which may be a capacitive, a resistive, or an optical sensor. In such arrangement, the tube 19, the conduit 21 and the valves 23 and 18 may be omitted, the sensor controlling directly the closing of the valve 12 after this has been opened, either manually or automatically under the control of a programmation device, to start the discharging of the reaction vessel.

It should be noted that the amount of precondensate which is removed after esterification in the first vessel 10 in accordance with the Type II process, need not be strictly half of the total amount of the reaction product in that vessel; the proportion of the product which is transferred to the polycondensation vessel 30 may be appreciably more than a half. For example, the amount transferred may in practice vary between 50 and 75% of the total amount of the reaction product in the vessel 10. The processes of the invention especially refer to the production of pure polyethylene terephthalate polyester. It is to be understood, however, that the apparatus may also be used in Type I and Type II processes for the production of high-molecular weight copolyesters. In these copolycondensation reactions a minor amount of ethylene glycol is replaced by other glycols, e.g. neopentyl glycol or 1,4-di(hydroxymethyl)-cyclohexane and/or a minor amount of terephthalic acid or its ester-forming derivatives is replaced by other dibasic acids such as e.g. isophthalic acid, sebacic acid and adipic acid or their ester-forming derivatives.

We claim:

1. In a polyesterification unit including an esterification vessel equipped for reflux distillation and having an agitator therein, means for supplying esterification reactants to said vessel, means for collecting the by-products of said esterification, means for adjusting the temperature and pressure in said esterification vessel, a polycondensation vessel equipped with an agitator, means for adjusting the temperature and pressure in said polycondensation vessel, means for collecting the by-produts of polycondensation, means for removing polyester from said polycondensation vessel, and conduit means communicating between said vessels, the improvement of a dual purpose unit adapted for selectively producing said polyester by a) a first reaction scheme whereby dimethyl terephthalate and ethylene glycol are reacted batchwise in said esterification vessel to form bis(2-hydroxyethyl)-terephthalate which is polycondensed in said polycondensation vessel or b) a second reaction scheme whereby terephthalic acid is esterified batchwise with ethylene glycol in the presence of previously formed bis(2-hydroxyethyl)-terephthalate to form a precondensate, a portion of the precondensate is recycled for further esterification, and the balance of the precondensate is polycondensed in said polycondensation vessel, wherein said conduit means comprises a first discharge conduit extending from the bottom of said esterification vessel for emptying the same, a second discharge conduit terminating within said esterification vessel at a level intermediate its top and bottom for discharging the portion of the vessel contents above said level, said second discharge conduit extending upwardly from said level and out of said esterification vessel, valve means for selectively placing either of said discharge conduits in communication with said polycondensation vessel, and means for pressurizing the interior of said vessel to expel said portion of its contents through said second discharge conduit.

2. The improvement of claim 1 wherein the termination level of said second discharge conduit is at a point above the vessel bottom which is equal to between one fourth and one half of the interior vessel height.

3. The improvement of claim 1 including means for adjusting the termination level of said second discharge conduit.

4. The improvement of claim 1 including a common conduit connecting between said valve means and said polycondensation vessel and selectively placed in communication with said two discharge means by said valve means.

5. The apparatus of claim 1 wherein said recycled precondensate is reacted with polyethylene glycol before using for further esterification.

* * * * *